LINE IDENTIFIER ARRANGEMENT FOR A COMMUNICATION SWITCHING SYSTEM

Filed Oct. 18, 1962 14 Sheets-Sheet 1

FIG. I

INVENTOR.
LUCAS BRUGLEMANS
BY C. A. Gulbrandsen
ATTY.

LINE IDENTIFIER ARRANGEMENT FOR A COMMUNICATION SWITCHING SYSTEM

Filed Oct. 18, 1962 14 Sheets-Sheet 3

Oct. 12, 1965 L. BRUGLEMANS 3,211,837

LINE IDENTIFIER ARRANGEMENT FOR A COMMUNICATION SWITCHING SYSTEM

Filed Oct. 18, 1962 14 Sheets-Sheet 4

LINE IDENTIFIER ARRANGEMENT FOR A COMMUNICATION SWITCHING SYSTEM

Filed Oct. 18, 1962 14 Sheets-Sheet 5

Oct. 12, 1965 L. BRUGLEMANS 3,211,837

LINE IDENTIFIER ARRANGEMENT FOR A COMMUNICATION SWITCHING SYSTEM

Filed Oct. 18, 1962 14 Sheets-Sheet 6

Oct. 12, 1965 L. BRUGLEMANS 3,211,837

LINE IDENTIFIER ARRANGEMENT FOR A COMMUNICATION SWITCHING SYSTEM

Filed Oct. 18, 1962 14 Sheets-Sheet 9

Oct. 12, 1965 L. BRUGLEMANS 3,211,837

LINE IDENTIFIER ARRANGEMENT FOR A COMMUNICATION SWITCHING SYSTEM

Filed Oct. 18, 1962 14 Sheets-Sheet 10

LINE IDENTIFIER ARRANGEMENT FOR A COMMUNICATION SWITCHING SYSTEM

Filed Oct. 18, 1962

Oct. 12, 1965 L. BRUGLEMANS 3,211,837

LINE IDENTIFIER ARRANGEMENT FOR A COMMUNICATION SWITCHING SYSTEM

Filed Oct. 18, 1962 14 Sheets-Sheet 13

3,211,837

LINE IDENTIFIER ARRANGEMENT FOR A COMMUNICATION SWITCHING SYSTEM

Lucas Bruglemans, Antwerp, Belgium, assignor to Automatic Electric Laboratories, Inc., Northlake, Ill., a corporation of Delaware Filed Oct. 18, 1962, Ser. No. 231,425
10 Claims. (Cl. 179—18)

Figure 1:
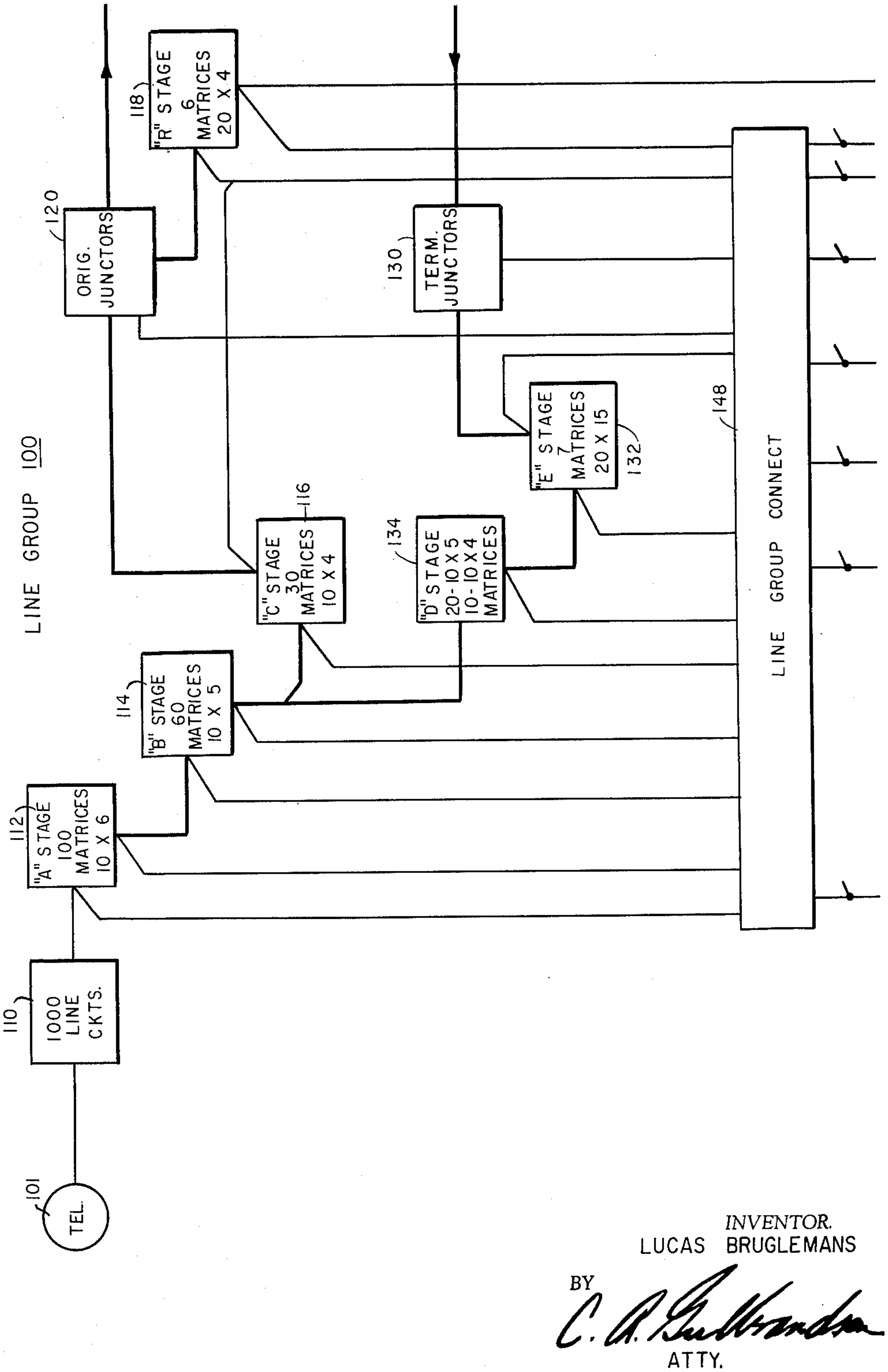
Figure 2:
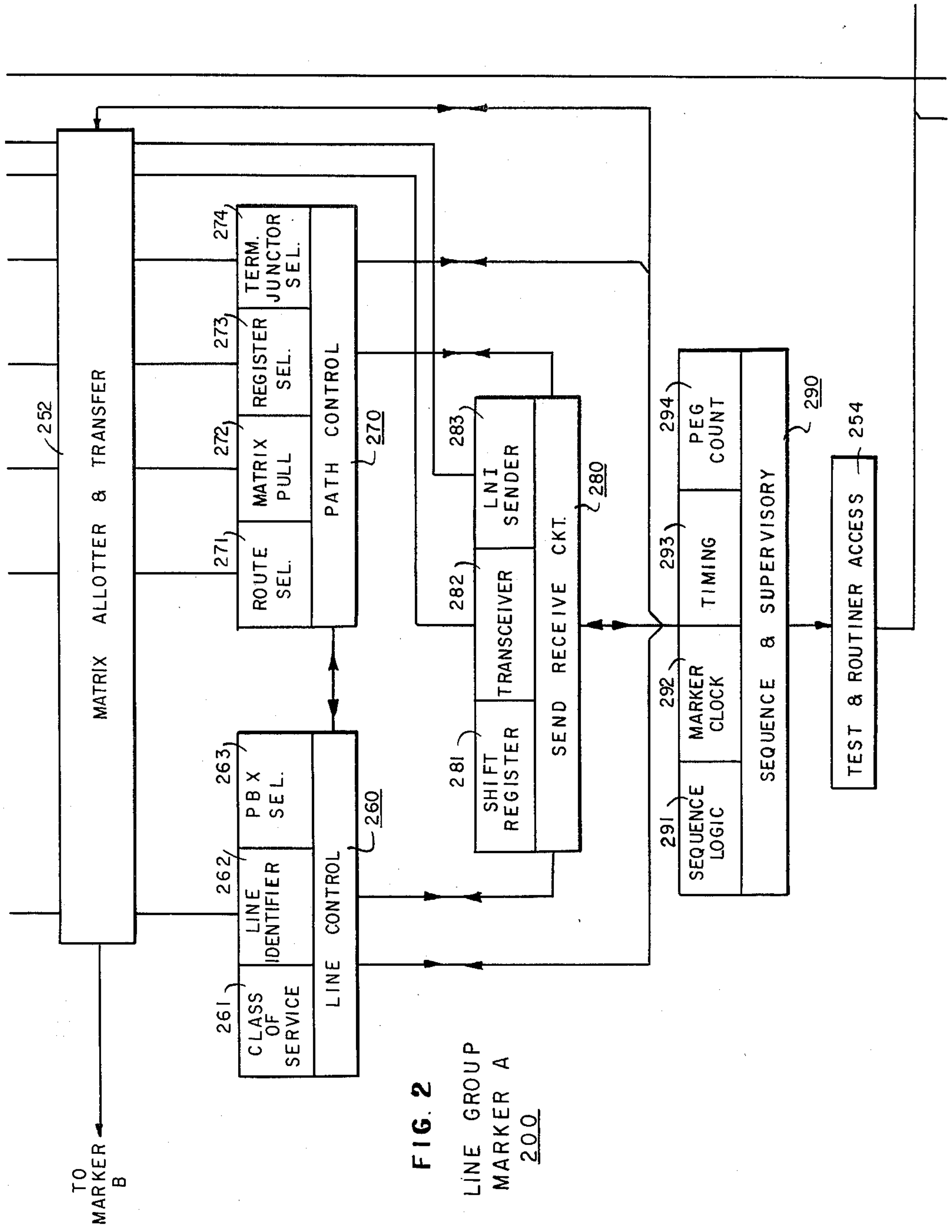
Figure 3:
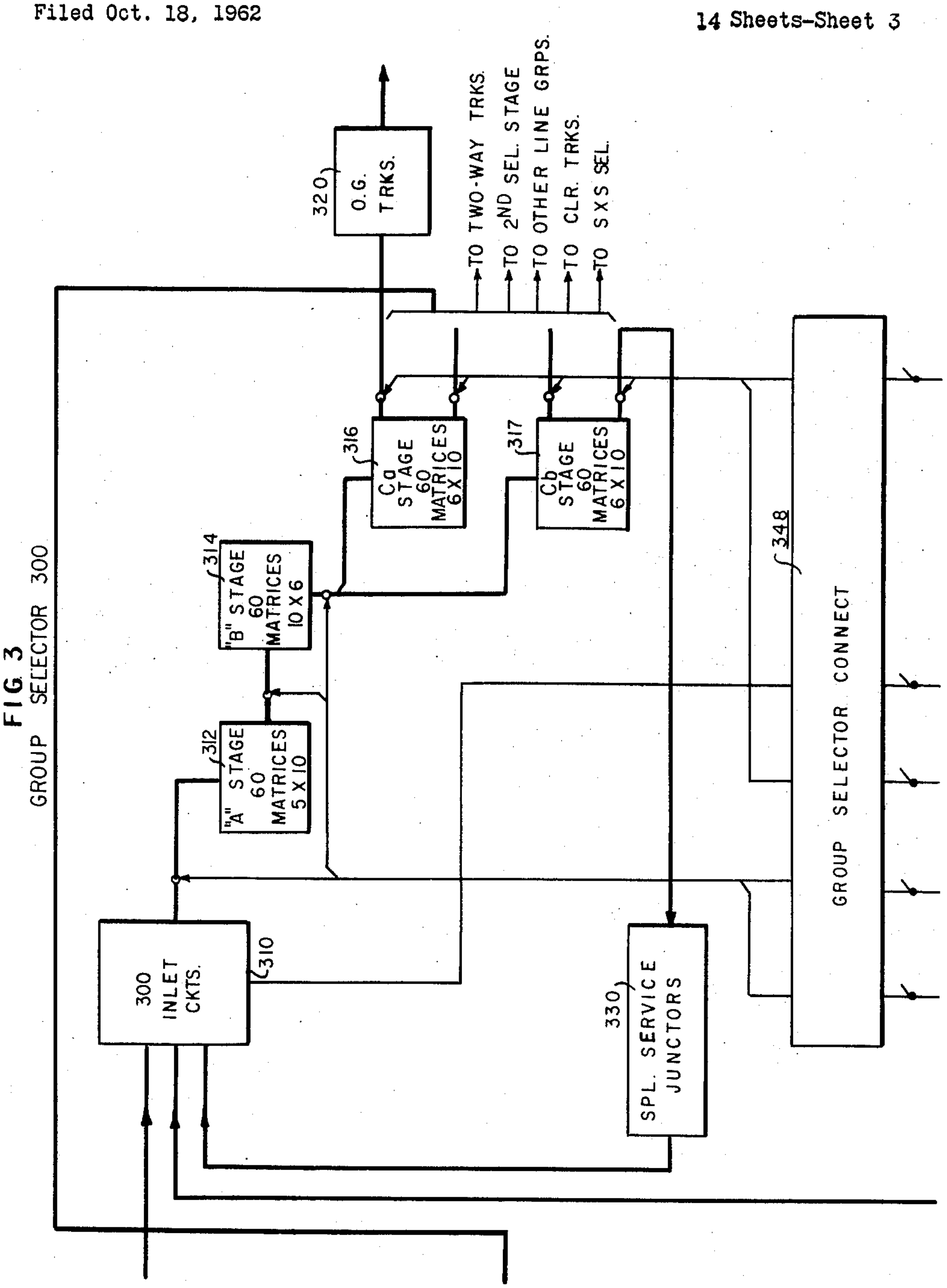
Figure 4:
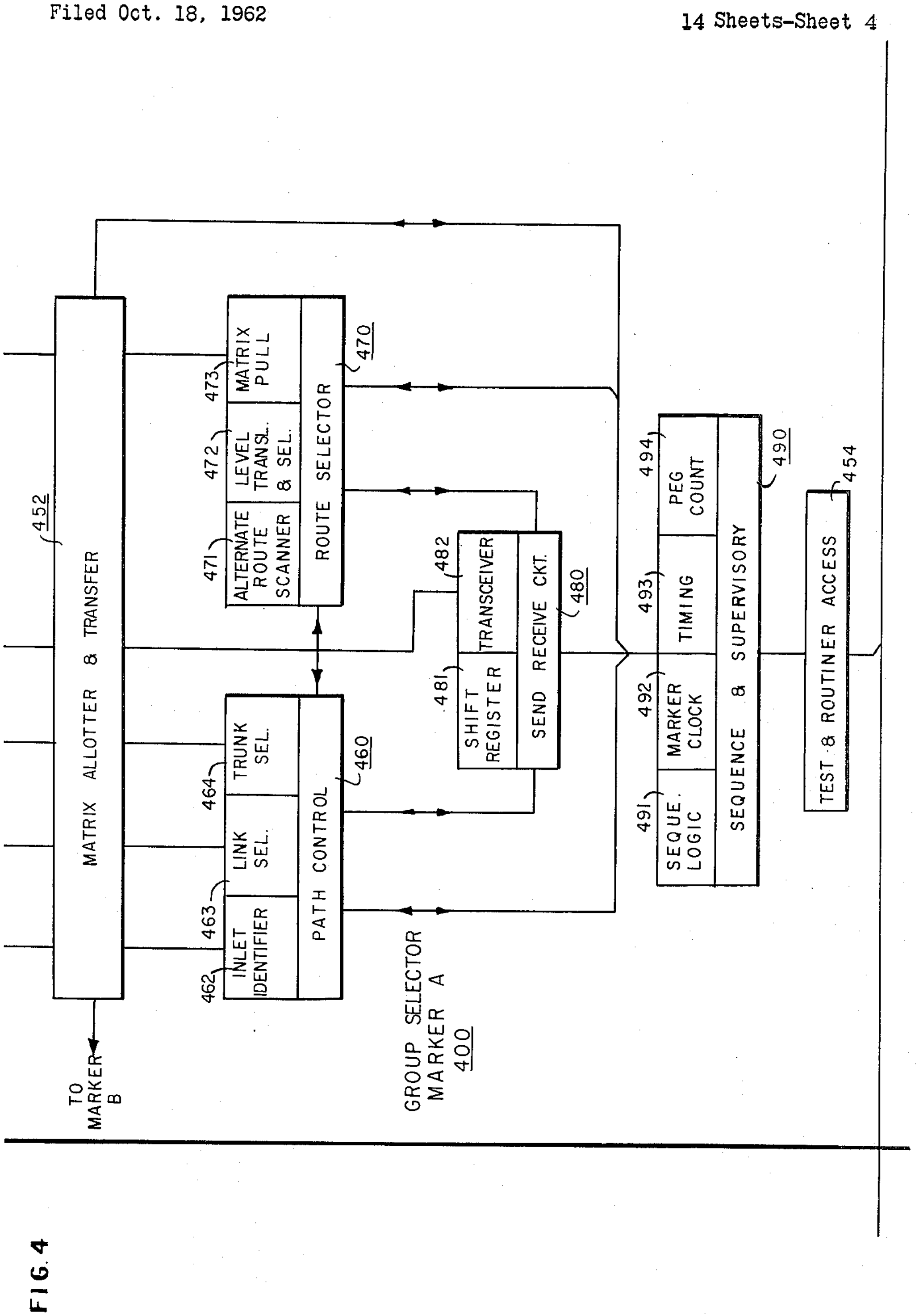
Figure 5:
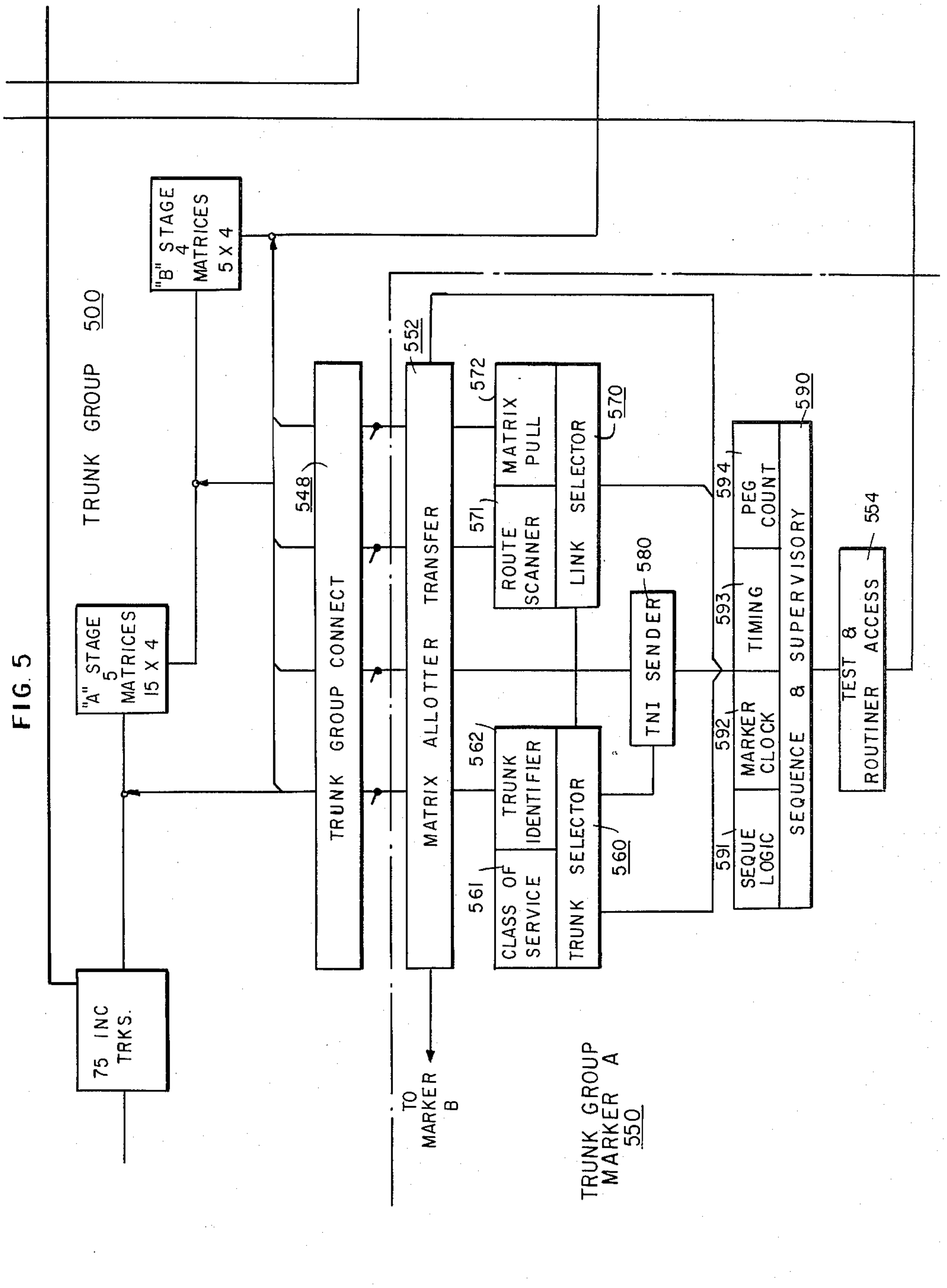
Figure 6:
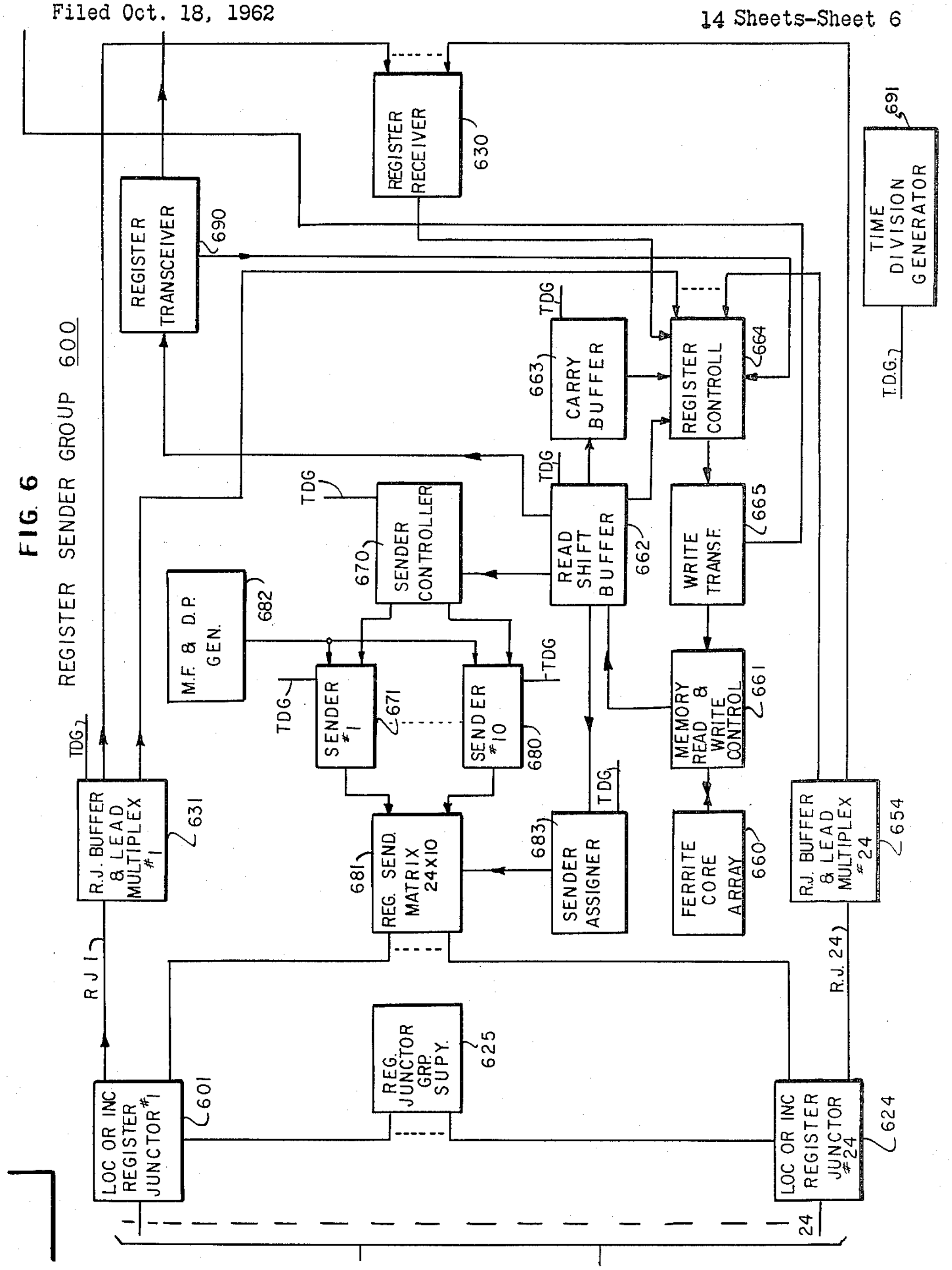
Figure 7:
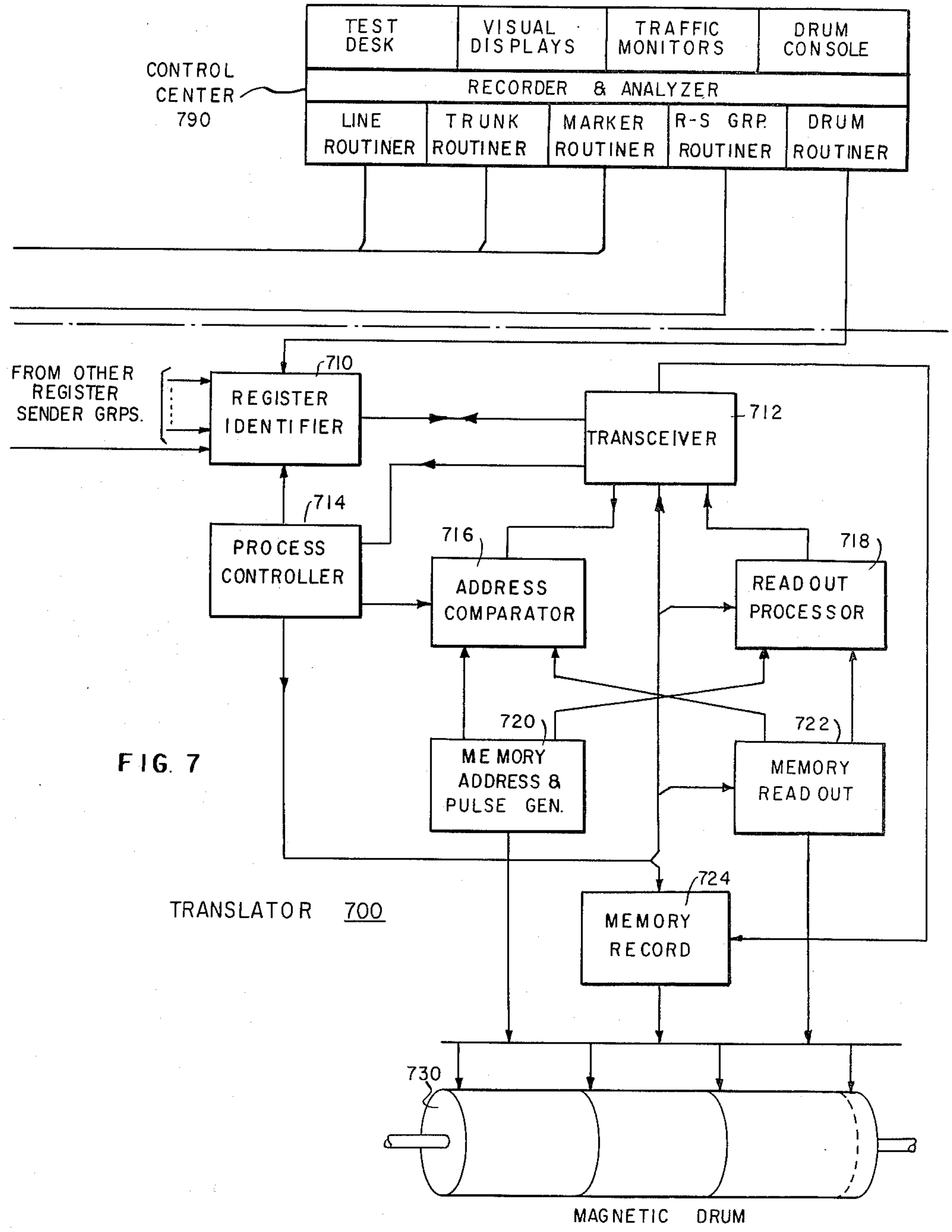

This invention relates to a line identifier arrangement for a communication switching system, and more particularly to a line identifier arrangement used with a marker controlled crosspoint switching network.

The object of this invention is to reduce the amount of equipment such as diodes and relay contacts required for line identification, and to increase the reliability of operation against component failures.

This invention relates to a switching system having a network for providing communication paths comprising a plurality of stages of crosspoint matrices, in which each crosspoint device includes a diode between the associated horizontal link and vertical link, this diode being part of the operate circuit for establishing a selected path, and the diodes in the successive stages being in series and poled in the same direction, such as that claimed in a copending application for Communication Switching System by Esperseth et al., Serial No. 240,497, filed November 28, 1962. According to the present invention a line identifier arrangement is provided which makes use of these diodes already provided in the main switching network matrices.

In a specific embodiment of the invention the links in the switching network have at least four conductors, two for the communication path, one for an operate or pull path, and one for a control or hold path. The crosspoint devices comprise relay assemblies having an operate or pull winding in series with the above mentioned diode in the pull conductor, a hold winding in series with one of its own contacts in the control or hold conductor, and a contact in each of the other conductors. The input links of the first stage are connected individually to line circuits, and each line circuit includes a line relay with a single contact which applies a marking potential to the pull conductor. This potential is such as to forward bias the diodes in the switching network and therefore appears through these diodes and windings through the successive stages in series. The lines are divided and sub divided so that in the first stage each matrix card at its input links to the line circuits constitutes a sub group, and each successive stage these are grouped into progressively larger groupings. Thus for example at the input links of the third stage each input can come from a different one of the second-stage groups, and the pull leads taken as a group to a scanner or parallel test circuit to select one of the second-stage groups. It is only necessary to use the input conductors of one of the third-stage matrix cards, since each matrix has a path to every one of the line circuits through the other stages. Having selected one of the second-stage groups, the input conductors from one of the matrices of that group at the inputs of the second stage may be connected through a scanner or parallel test circuit to select the one of that group in which the call appears. The result of that test is then used to connect the input terminals of one of the first stage cards to a scanner or parallel test circuit to select the particular line which is calling.

Figure 10:
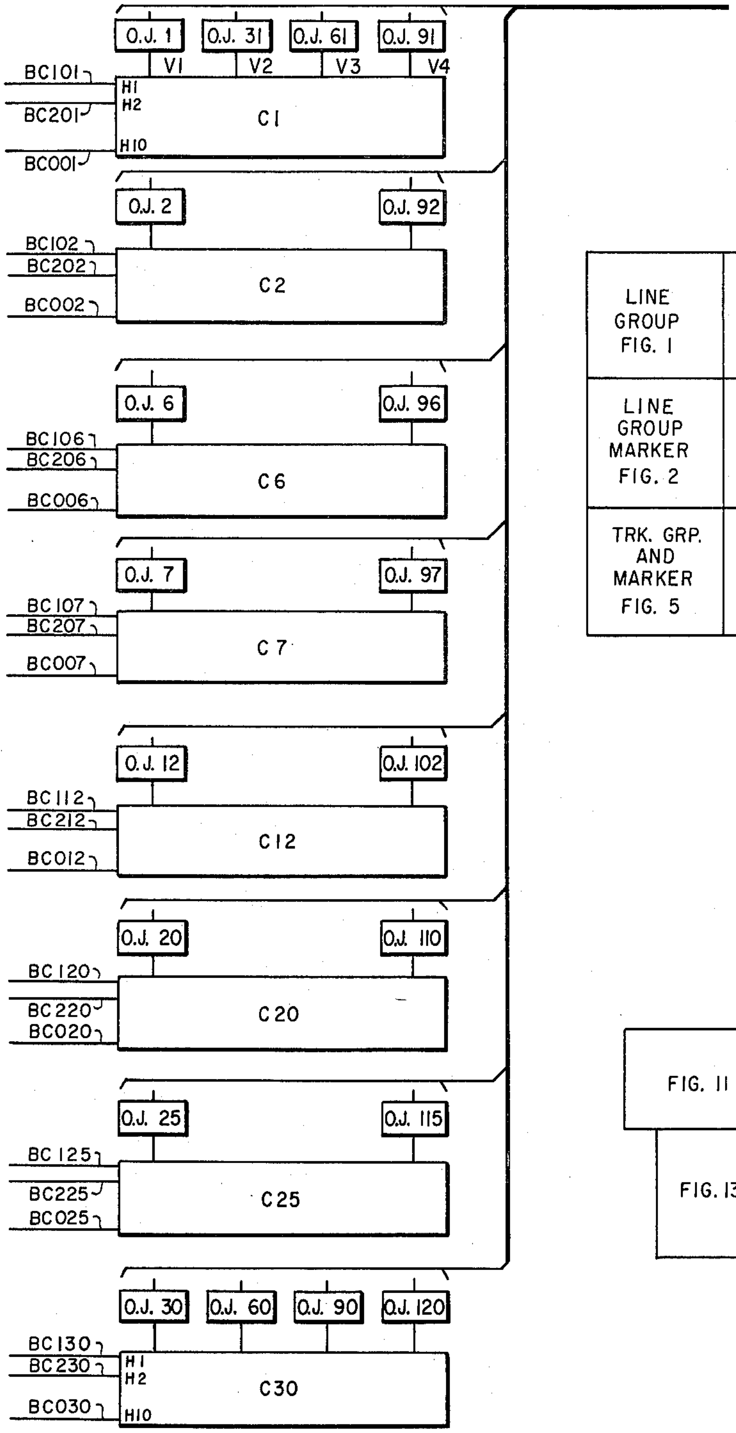
Figure 8:
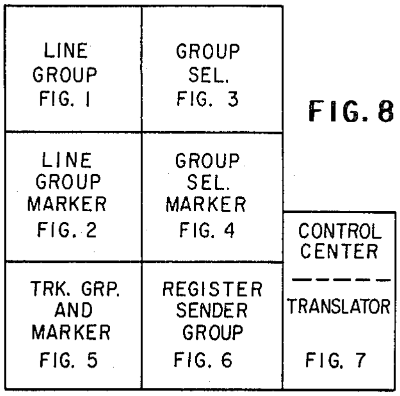
Figure 9:
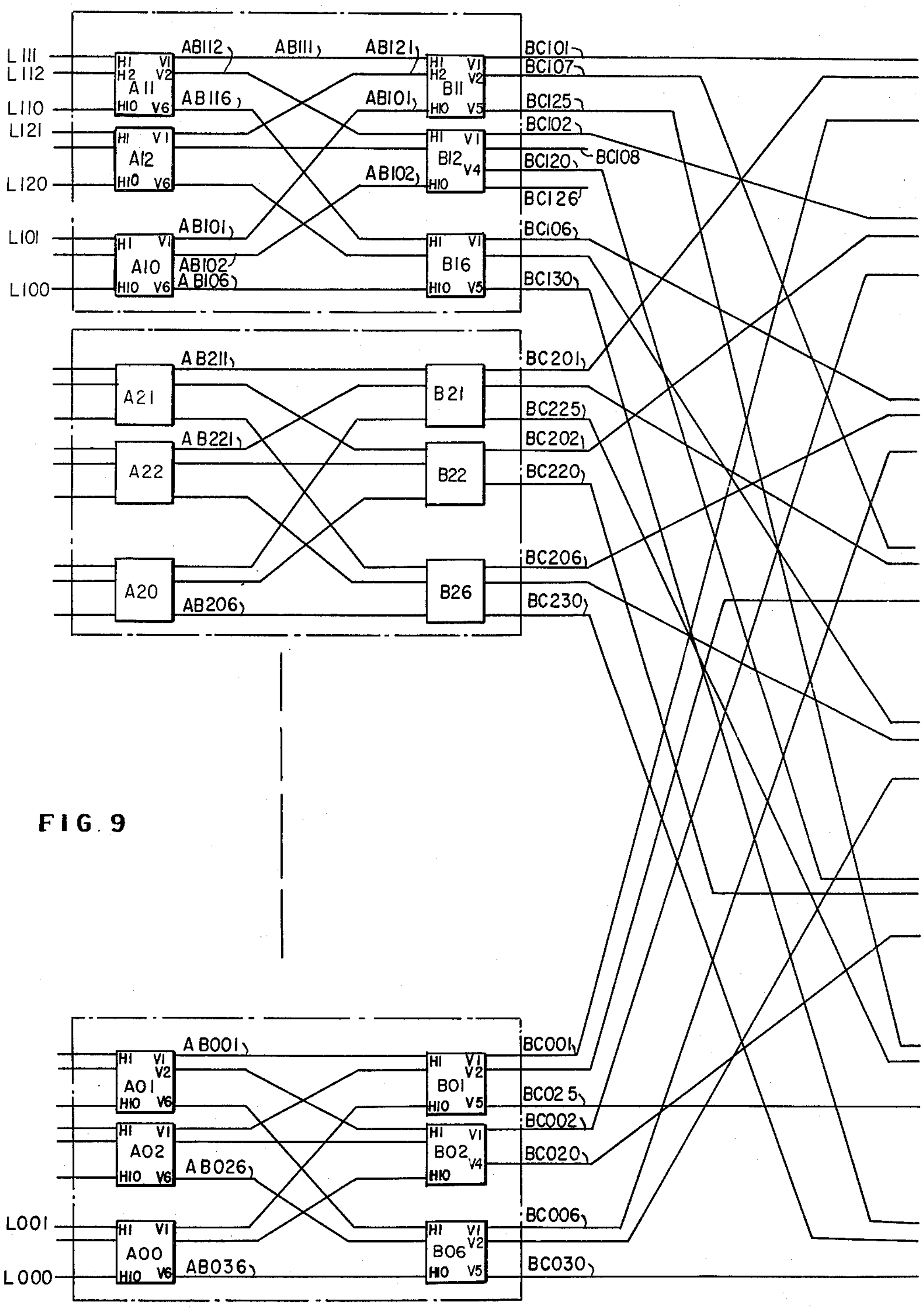

The above-mentioned and other objects and features of this invention and the manner of attaining them will become more apparent, and the invention itself will be best understood, by reference to the following description of an embodiment of the invention taken in conjunction with the accompanying drawings comprising FIGS. 1 to 16 wherein;

FIGS. 1 to 7 when arranged as shown in FIG. 8 comprise a block diagram of a telephone switching exchange;

FIG. 8 shows how FIGS. 1 to 7 are to be arranged;

FIGS. 9 and 10, with FIG. 10 to the right of FIG. 9, comprise a diagram showing the interconnection of the matrices in three stages of the switching network of a line group.

Figure 16:
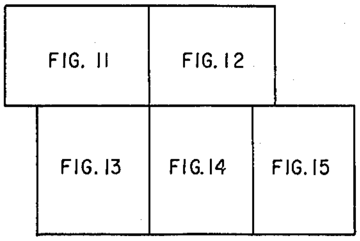

FIGS. 11 to 15 when arranged as shown in FIG. 16 comprise a diagram of that part of a line group network and marker which is used for line identification; and FIG. 16 shows how FIGS. 11 to 15 are to be arranged.

SYSTEM ORGANIZATION

The system consists of the line group 100, group selector 300, register-sender group 600, and the translator 700. There is also a trunk group 500 which provides access from incoming trunks to the registers, and a control center 790 which contains a special computer for operation analysis and recording, and program upgrading equipment.

All of the electronic equipment is furnished in duplicate, for instance, two line group markers 200 may serve up to ten line groups and two group selector markers 400 may serve up to ten group selectors. A minimum of two register-sender groups 600 will be equipped per office and the translator 700, including the magnetic drum 730 and logic circuitry, will always be furnished in pairs per ten thousand directory numbers.

Time division techniques are used in the register-sender group 600 and in the translator 700. The markers are designed on an electronic basis and semi-conductor circuitry is employed throughout the system. A ferrite core memory 660 is used for temporary storage whereas the magnetic drum 730 is used for semi-permanent storage.

The space division switching elements of the system consists of reed relay matrix assemblies in configurations of 10 x 6, 10 x 5 and 10 x 4. The crosspoints are made up of reed capsules and having normally two windings. They are mounted on a two layer printed card and the entire assembly constitutes a switching matrix. In some cases the cards are wired together to form a single larger matrix. The system contains no conventional telephone relays, but, similar functions are performed by reed relays. A reed relay assembly is essentially a cluster of magnetic reed elements controlled by coil windings and with or without a permanent magnet. For further description of the reed relay assemblies and crosspoint matrix assemblies the following pending United States Patent applications may be referred to:

E. J. Glenner and K. K. Spellnes, Crosspoint Switching Arrays, Serial No. 127,237, filed July 27, 1961, now Patent No. 3,188,423, issued June 8, 1965.

G. S. Lychyk and A. Taliste, Dry Reed Relays, Serial No. 127,648, filed July 28, 1961, now Patent No. 3,128,356, issued April 7, 1964.

P. K. Gerlach, G. J. David and R. O. Stoehr, Printed Matrix Board Assembly, Serial No. 132,897, filed August 21, 1961, now Patent No. 3,193,731, issued July 6, 1965.

The electronic logic circuitry employs eight standard circuits as building blocks. These standard circuits include NOR gates, inverters, flip-flops, clocks, gated pulse amplifiers, parallel test circuit, parity circuit, and reed relay driver. All of these circuits are implemented on double or single-sided printed cards 6 inches by 5½ inches.

The two switching stages, the line group and group selector may not necessarily be installed in the same building. The line group may be remotely located and will then operate as a satellite office. No register-senders will be needed in the satellite, but a transceiver will provide for sending and receiving of switching information between the markers of the satellite and the register-senders in the main office.

The method of signalling between the system groups is accomplished by a technique called di-phase. This method employs a phase shift technique for serial sending and receiving of pulses.

The group selector may, in connection with the register-sender group and the translator, operate as a trunk tandem office and for this purpose the line group is not necessary. By using matrices with six reed capsules per crosspoint, this group selector marker may accommodate 4-wire switching.

The reason for this flexible operation of the system lies in the fact that the register-sender group, in connection with the storage in the translator, has sufficiently built-in features for the above described operation.

TRACING OF A LOCAL CALL

As an introduction to the system operation, a brief description of a typical local call as processed through the system is now presented. The block diagram may be followed for tracing the call.

When a subscriber lifts the handset, the line group marker 200 goes into action first by detecting the originating call mark, identifying the calling line, and selecting an idle register junctor within the register-sender. A path is then temporarily established from the calling telephone to the register junctor via the A, B, C, and R matrices, and the subscriber receives dial tone. The dialed digits are stored temporarily, coded, and processing is continued as these digits are passed to the translator 700, analyzed for type of incoming call, and instructions are selected from the drum memory 730 and returned to the register-sender 600 to guide further handling of the call. Upon receipt of the remaining digits, the translator 700 returns switching instructions corresponding to the called number as stored in the drum memory 730. The instructions are transmitted from the register-sender 600 via one of the senders 671–680 and the originating junctor 120 of the originating line group to the group selector 300. In the group selector 300, the instructions are analyzed by the marker 400, an idle terminating junction 130 in the terminating line group is located, and a path established to that line group via the A, B, and C matrices of the group selector. The remaining instructions are followed by the line group marker to locate the called line terminals, select and seize a path from the terminating junction through the E, D, B and A matrices to the called line. The terminating junctor establishes ringing, answer supervision, and talking battery for both parties when the call is answered.

Since the system is a common control operation, the markers of the line group and group selector function only to serve the assigned portion of the call processing then release to serve other calls. The register-sender 600 and the translator 700 are functioning on a time division basis and therefore are processing several calls simultaneously. The temporary signaling and control paths are released for further service while only the talking paths are held through the switching matrices and junctors.

THE LINE GROUP

*Line group matrix*

This section of the system may be thought of as a large switching unit capable of connecting any one of 1000 lines originating calls to any one of 120 circuits called originating junctors 120. Likewise, this unit is capable of connecting any one of 120 circuits called terminating junctors 130 and representing incoming calls to any one of the 1000 lines served by this line group. Crosspoint matrices constitute the switching network and provide concentration going outward for originating calls, and expansion going inward for terminating calls. For practical and economic reasons, three stages A, B, and C, make up the outgoing switching stages. Four stages, E, D, B and A, make up the incoming switching stages. The 1000 subscribers lines divided into ten groups of 100 each, are located on the main distributing frame and from there are jumpered directly to the A stage 112. No intermediate distributing frame is required. The A stage has 600 outlets or links (60 for each of the ten "hundreds" group) appearing as inlets to the B stage 114. The B stage, in turn, has 300 links (30 for each "hundreds" group) appearing as inlets to the C stage 116. The C stage has 120 links to originating junctors 120. The originating junctors provide bypaths via the "R" stage to twenty-four registers and also provide access to the inlet circuits 310 of the group selector 300. With this switching configuration, a fully equipped line group is capable of handling a maximum traffic of three unit calls per line in each direction at a grade of service better than .01.

The switching stage matrices are made up crosspoint reed relays, 15,000 for a fully equipped 1000 line group or 15 per line (12 per line for two unit calls per line). The reed relay coil has two windings, an operate (or pull) winding and a hold winding, and has three contacts. Two of the contacts switch the transmission loop. A third locks the hold winding to the sleeve or "C" lead.

The subscriber's line equipment is similar to a conventional line and cut-off circuit except that reed relays are used and fewer contacts are required. Reed relays were chosen over a static line circuit for simplicity and reliability of operation and for electrical isolation of electronic apparatus from outside plant disturbances.

A maximum of thirty subscribers in a given hundreds group may be engaged in different conversations at one time. One originating and one terminating junctor, two each of A and B crosspoint reed relays, and one each of D, C, and E crosspoint reed relays are held in the line group per conversation. Registers are held only during dialing.

The originating and terminating junctors mentioned earlier are reed relay circuits performing several functions. The originating junctor provides loop splitting facilties for an originating call. Initially, a transmission path is provided from the calling line to register and an additional path is provided from register to group selector for early outpulsing. When the called line is reached, the originating junctor switches the calling line through to the terminating junctor via the group selector. The circuit also provides a busy tone bridge in the event of no link availability.

The terminating junctor performs functions necessary to extend the call to a called subscriber. It provides a path into the line group marker for signaling between the code receiver in the marker and the sender circuit. The circuit provides regular or party line ringing controls, ring back tone, and ring cut-off controls. When line busy is encountered, busy tone is provided at this point. It provides transmission battery feed for both called and calling parties. On test calls and busy verification calls, the junctor removes the battery feeds and switches the calling line metallically through to the called line. For official calls, answer supervision is disabled within the junctor to prevent charging of the calling end. Thus, it is seen that special service calls are also handled by the terminating junctor via the regular switching network eliminating the need for a special switch train.

*Line group marker*

Two markers 200 are always provided and the 1000 line groups are divided between the two up to a maximum of five line groups per marker. Each marker serves its associated line group matrices on an allotted basis, but, is also capable of assuming the load of its companion marker.

In its idle state, a marker continuously scans for requests for service from the line groups with which it is associated. Upon recognizing a call, either originating or terminating, in a particular line group, it locks out all other groups via its allotter and allows the connect circuitry of the selected group to switch in the matrix leads into the marker for processing. Approximately 400 leads are so controlled. All calls in the allotted line group are processed before the marker returns to its idle state to serve other groups.

When connected to a line group, the marker has two primary functions, connect a line originating a call through the matrices and originating junctor to a register and to connect a terminating junctor (representing an incoming call) through the matrices to the called line. Both reed relays and electronic circuitry are used to perform these jobs. The electronic circuitry provides all logic and scanning operations requiring high speed. Reed relays are used merely for connecting purposes, to switch in the necessary groups of leads into the electronic circuitry for analysis. With this combination of components, the processing of a request for service by the line group marker is accomplished in approximately 100 milliseconds.

For each function, the marker performs several tasks. In general, for originating traffic, it must provide line number identification, pathfinding and route selection, sending of line number identification, class of service (225), and line group identity. For terminating traffic, it must provide terminating junctor identification, transceiver for communicating with the sender circuit, access to called line for busy test, PBX selection, and pathfinding and route selection.

The tasks performed by the marker in processing a call are controlled by a sequence and supervisory circuit 290. This control may be compared to a programmed computer in that the marker follows a fixed plan of operation. All marker operations are governed by this control.

Included is the clock circuit which provides pulses to synchronize operations within the marker and the timing circuitry which is used to generate various time-out periods such as that provided between a reed relay operation and a succeeding electronic scanning operation. Once the supervisory control recognizes a request for service, either terminating or originating, it will process this call from beginning to end, locking out all other calls.

*Operational description*

The line identifier provides a unique identification of one calling line from the group of 1000 lines. In the event of a simultaneous request for service by two or more lines, all lines but one are excluded from the processing. By means of a contact on the line reed relay, the identifier recognizes a request for service and is able to provide a three digit line identification—hundreds, tens and units. Thus, it is possible to uniquely mark one of the one thousand "pull" leads at the inputs to the "A" stage matrices. Reed relays are used for a "tree" configuration to reach the desired "pull" lead after the identity has been made.

Pathfinding consists of establishing an idle route through the A, B, C, and R matrices from the identified calling line to a register. The marker, after the line identity, preselects any idle register located on the outlets of the R matrix. The term "preselect" is used in that the selection is conditional upon whether an idle route exists back to the calling line. Having preselected a register, the marker now has sufficient information to gate all originating junctors and BC links that can be reached from these two end points. The BC links will be marked busy or idle depending on whether they themselves are busy or idle. It now becomes a single matter to scan these possibilities for an idle route. If no idle path can be found, another register is preselected which then presents other route possibilities. Having found an idle route, all information for completing the connection is available.

When acknowledgment is received from the register after marker information has been outpulsed, a "pull" potential is applied at the C matrix outlet to pull up in series the A, B, C crosspoints to the potential applied by the identifier at the input to the A matrix. Another "pull" potential is applied to the "R" matrix outlet to pull up the "R" crosspoint. This A to C and R pull connection will be held until the cut-off reed relay operates.

At a signal from the register-sender circuitry the line number and line group identity is electronically pulsed out to the register-sender via the link connecting the "R" matrix and the register. Serial sending of information using high speed pulsing is employed.

The register acknowledges receipt of information and returns a command to the originating junctor to ground the C lead. The C lead holds the matrix connections and operates the cut-off reed relay that, in turn, grounds the pull lead. This signal is recognized by the marker, and the supervisory control removes the pull potentials. Rather than clearing out immediately, the marker waits a few milliseconds to see whether the connection is actually good, which means being held via the "C" lead. If all checks out, the marker enters a "clear out" interval where all functioning circuits are permitted to restore to normal before attempting to process other awaiting calls.

A terminating junctor scanner detects terminating calls awaiting service. This scan is the first to be made after a marker cycle has been completed in order to give preference to terminating calls. With identification of one of the 120 terminating junctors requesting service, the transceiver of the marker is switched to the junctor to receive from the sender the called line number identity and ringing frequency.

The address of the called line is gated into that portion of the identifier which has access to the "pull" leads. If the called line is busy, its cut-off reed relay has been operated and the identifier will find the busy ground on the pull lead. If the line is idle, the identifier is positioned at the called line pull lead and ready to apply the pull potentiol subject to the command of the supervisory control.

This function operates in principle the same as that described for processing originating traffic. Knowing the called line identity and the terminating junctor identity, the marker can analyze all possible routes through the A, B, D, and E matrices between these two end points and select one route that is idle. Application of pull potential awaiting cut-off operation and verification of holding follows as before.

A two-way communication path exists between the marker processing a terminating call and the sender circuit. In addition to receiving the called line number and any special instructions regarding the line, the marker may signal back to the sender any conditions peculiar to the line such as line busy, line idle, link congestion, recycle and send again, and be referred back to the sender for appropriate action.

If on a terminating call, the marker transceiver received a PBX call indication, a PBX selector circuit marks all lines in the PBX group and enables the line identifier to make a sequential test to select the first idle line. A maximum of 200 lines may be allocated within a 1000 line group for PBX service. Assignment of lines to a PBX group does not require consecutive numbering allocation.

LINE IDENTIFICATION ARRANGEMENT

Figure 11:
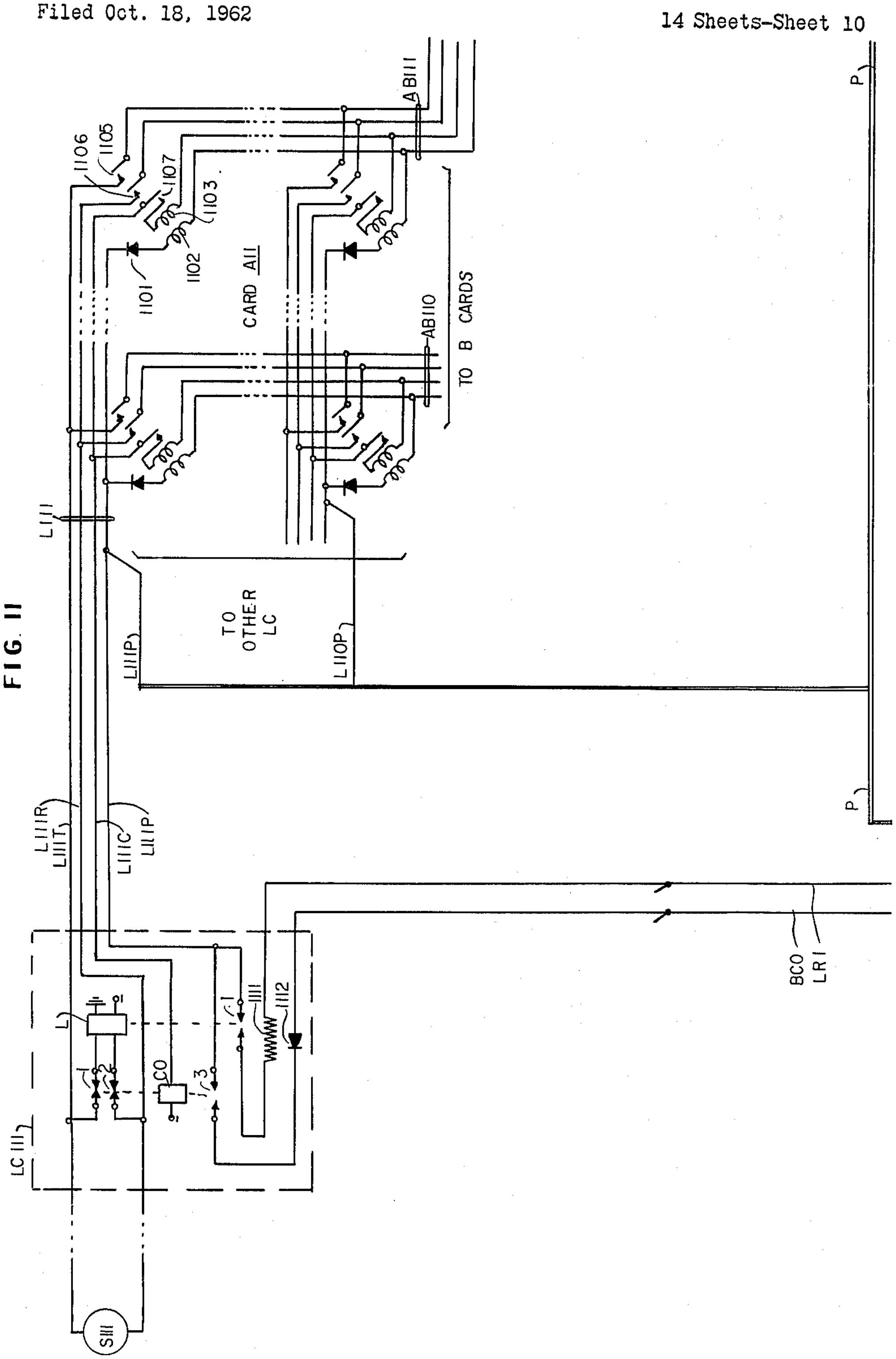
Figure 12:
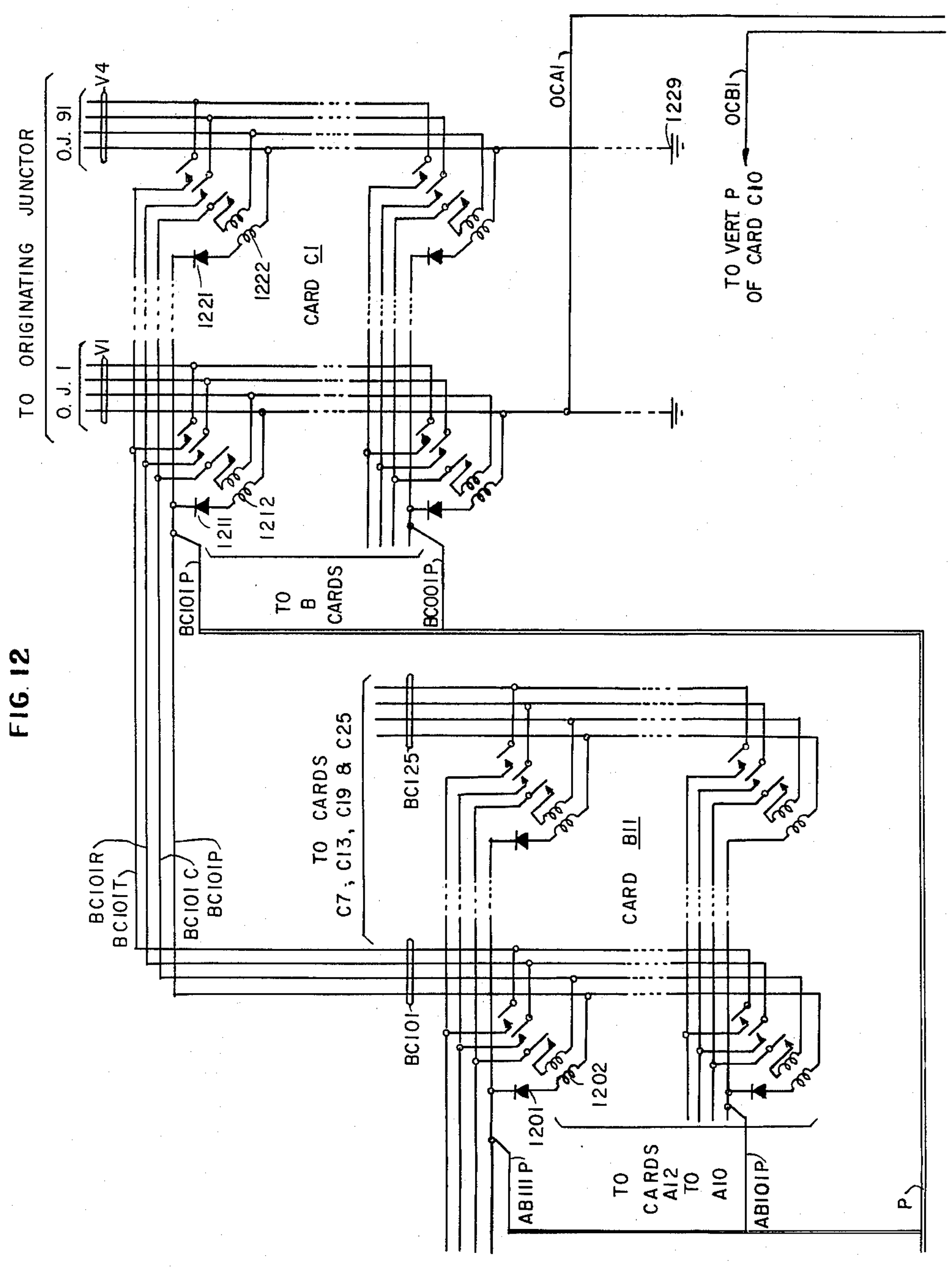

The portion of the line group switching network used for an originating connection is shown in block diagram form in FIGS. 9 and 10, with FIG. 10 placed to the right of FIG. 9; and in schematic form in FIGS. 11 and 12 and with FIG. 12 placed to the right to FIG. 11. This portion of the switching network comprises the A stage 112, the B stage 114 and the C stage 116 built up as shown in FIGS. 9 and 10. In these switching stages each matrix comprises a single card shown in FIGS. 9 and 10 as an individual block. The subscriber lines are connected on the horizontal inputs of the A cards, such that ten lines are connected at each A card. Therefore ten A cards are provided for a group of 100 lines. Also for each hundreds group, six B cards are provided, each B card having one input connected to each A card. A group of thirty C cards, common to the ten hundreds groups or 1000 lines is connected to the B cards. The connections are such that each C card has its ten inputs connected to the ten different hundreds groups, in such a way that in each hundreds group they go to the same input of the same B card. Thus since there are six B cards per hundreds group, the card C7 is connected to the same B cards as card C1.

All of the matrix cards are designated by reference characters in which an initial letter designates the switching stage. In the A and B stages the letter is followed by two numbers the first number indicating the hundreds group and the second letter indicating the card within the hundreds group. Thus in hundreds group one there are ten A cards A11 to A19 and A10 and six B cards B11 to B16. These A and B stages are interconnected by links designated by the letters AB followed by three numbers, in which the first number indicates the hundreds group the second number indicates the A matrix in the hundreds group and the third number indicates the B matrix in the hundreds group to which the link is connected. Thus link AB111 of the first hundreds group connects card A11 to card B11. The lines from the line circuits to the inputs of the A stage are designated by the letter L followed by three digits, with the first number indicating the hundreds group the second number indicating the A matrix within the hundreds group and the third number indicating the input of the A matrix. Thus lines L111 to L119 and L110 are connected to the ten inputs of matrix card A11. In the C stage the matrix cards are designated C1 to C30. The links interconnecting the B and C stages are designated by the letters BC followed by three numbers. The first number indicating the hundreds group of the B card and the last two numbers indicating the C card, with a zero inserted as the center number for connections to cards C1 to C9.

The schematic diagram of FIGS. 11 and 12 shows part of one matrix card for each of the three stages, and also a line circuit. Each matrix card comprises a plurality of horizontal links and a plurality of vertical links interconnected by crosspoint switches. Each link comprises four conductors, tip T, ring R, control C, and pull P. The tip and ring conductors provide an extension of the subscriber's loop for a talking path, the pull conductor is used to operate the crosspoints, and the control conductor is used to hold the crosspoints in a selected path. Between each horizontal link and each vertical link of a matrix card there is a crosspoint switch comprising three make contacts in reed capsules, two windings, and a diode. For example in matrix card A11 the crosspoint switch between horizontal link L111 and vertical link AB111 comprises the contacts 1105 and 1106 in the tip and ring conductors respectively, contacts 1107 in series with hold winding 1103 in the control conductor, and the pull winding 1102 in series with a diode 1101 in the pull conductor. To establish an originating path after the marker has selected the route, an operate circuit is established on the pull conductor through the three stages in series, through one crosspoint switch in each stage, to operate the crosspoints, and then a hold path is established on the C conductor through the three crosspoints to hold the connection. For example if a path is to be established from line circuit LC111 to originating junctor OJ91 negative potential is applied to the lead L111P and ground from a conductor 1229 is applied through a relay tree in the marker (not shown) to the P conductor of the vertical link V4 of card C1. This causes current to flow in the path through diode 1101 and winding 1102 on card A11, through diode 1201 and the winding 1202 on card B11, and through diode 1221 and winding 1222 on card C, causing the three crosspoint switches to operate in series. The diodes block current flow through undesired paths through other pull windings of each card. To hold the path, ground is applied from other circuits to the C conductor of the vertical link V4 which extends through the hold windings and their series contacts of the three crosspoint switches and the cutoff relay CO of line circuit LC111 to negative battery potential.

The line circuit LC111 comprises a line relay L having two windings and a single make contact, and a cutoff relay CO having a winding, two break contacts 1 and 2, and a make contact 3. The tip and ring conductors L111T and L111R of line L111, which are connected to the subscriber's loop, are also connected through the break contacts 1 and 2 of the cutoff relay CO through the windings of the line relay L to ground and negative battery respectively. The conductor L111C is connected through the winding of the cutoff relay CO to negative battery. The conductor L111P is connected through the make contacts of relay L and a 5600-ohm resistor 1111 to conductor LR to the marker; and also through the make contacts 3 of the cutoff relay CO and a diode 1112 to conductor BCO to the marker. The conductors LR and BCO are multipled to all of the 1000 line circuits of the group.

Figure 13:
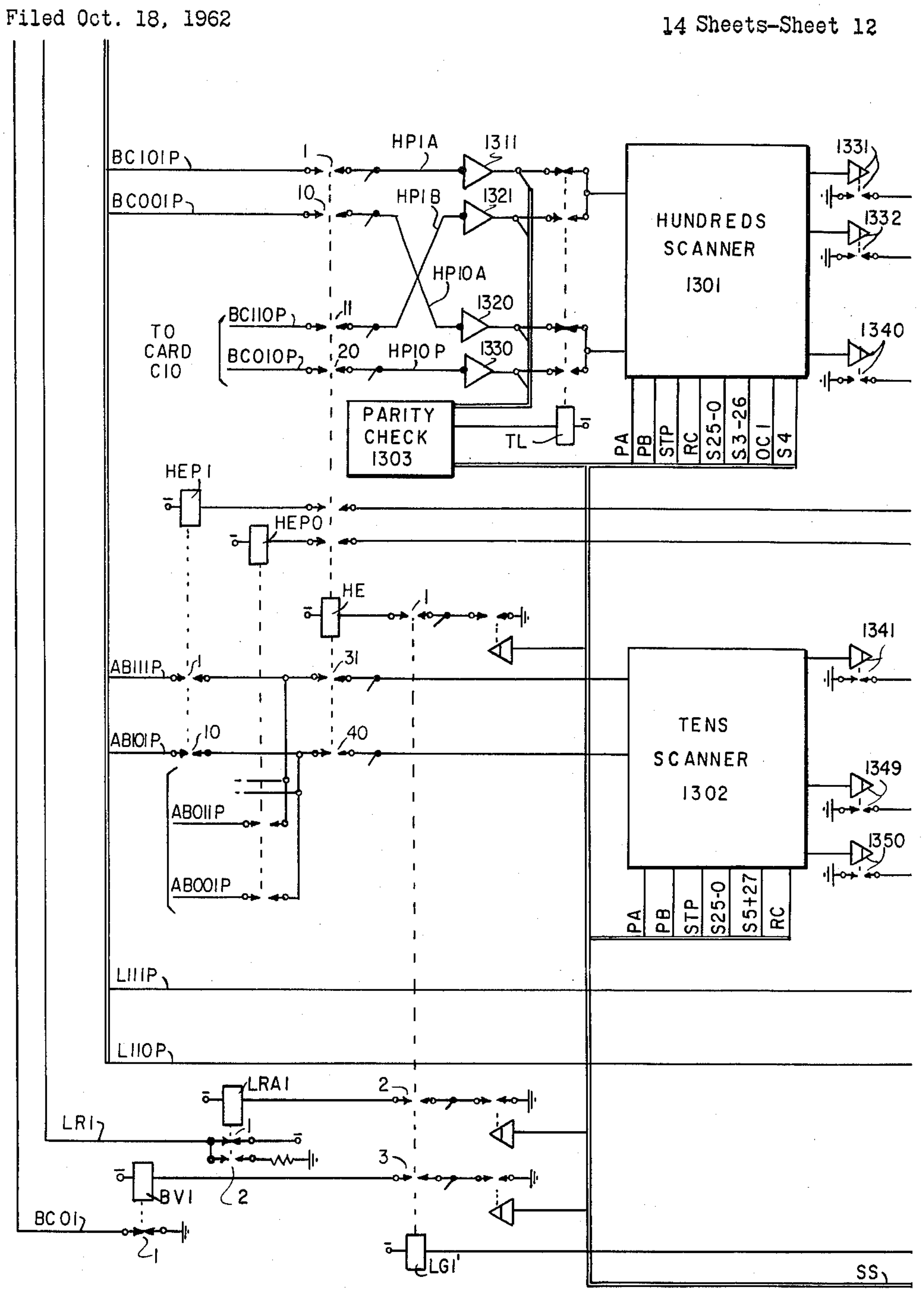
Figure 14:
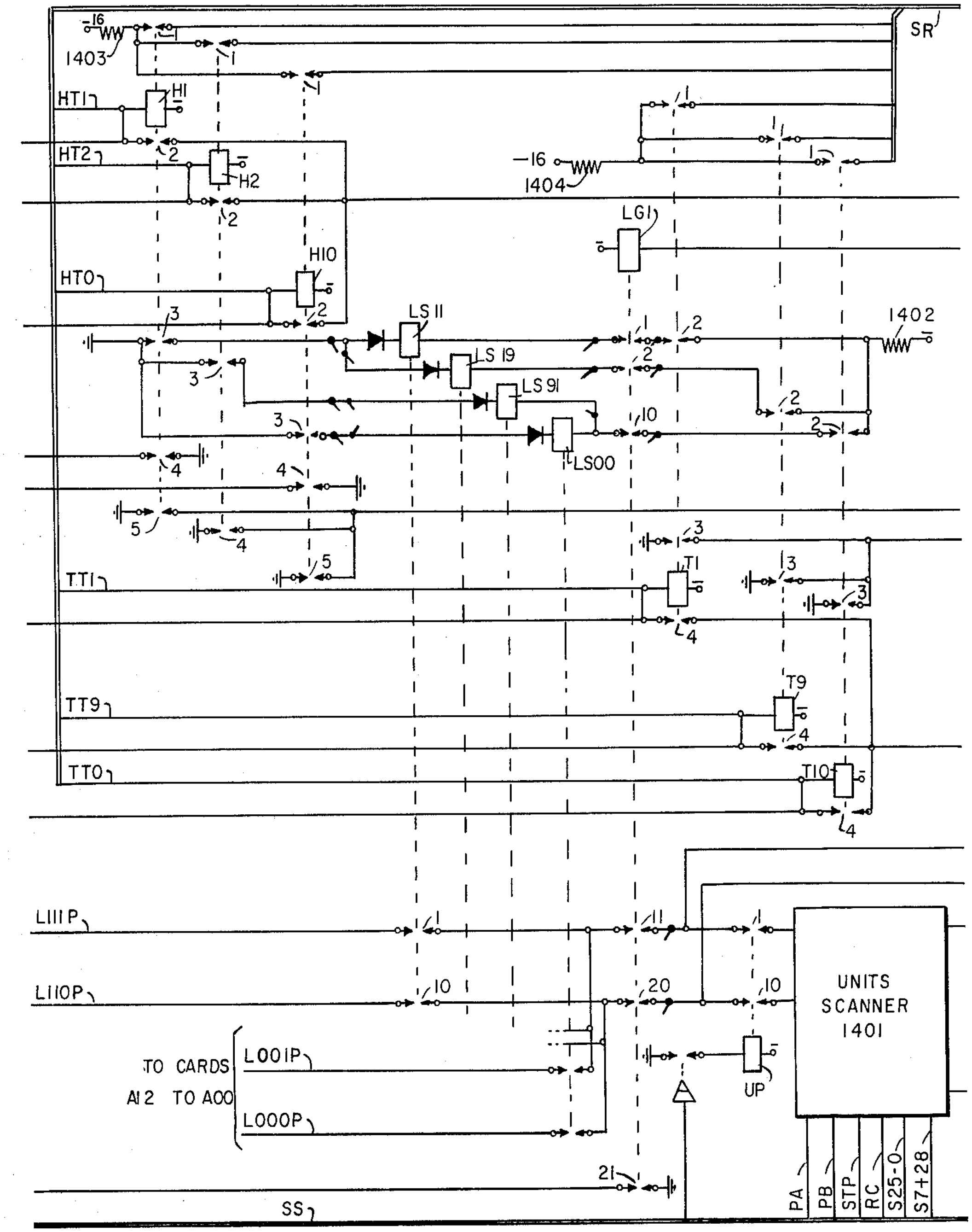
Figure 15:
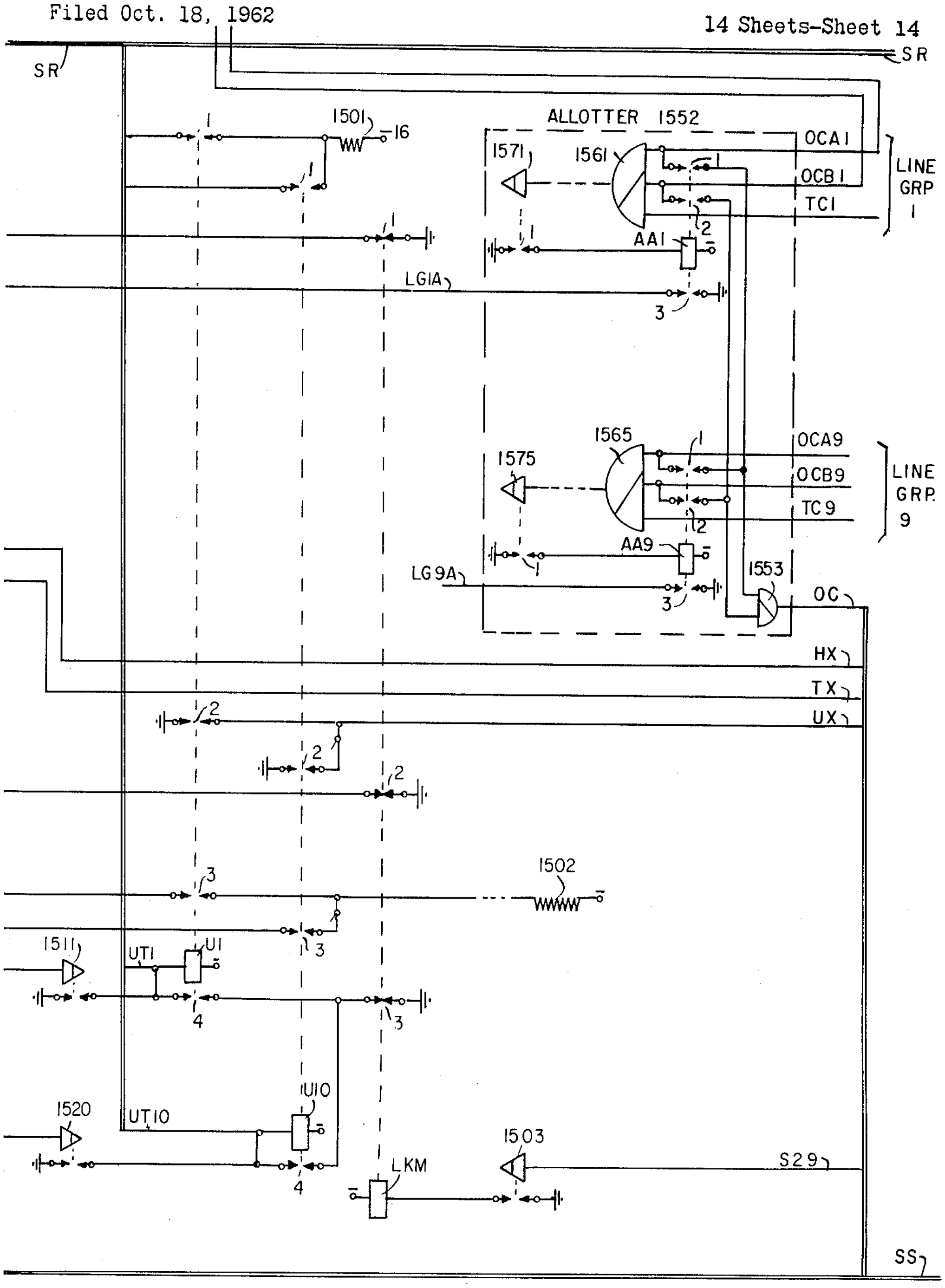

FIGS. 13, 14 and 15 show the line identifier 262 and associated portions of the line group connect unit 148. A portion 1552 of the allotter 252 is also shown. These FIGS. 13–15 along with FIGS. 11 and 12 should be arranged as shown in FIG. 16. For convenience the components associated with the line identifier 262 and the line group connect unit 148 have been shown together, and the transfer contacts of unit 252 which connect these circuits have been omitted. Also for convenience in the drawing relays are shown having a large number of contacts although in the physical embodiment of this system the reed relay assemblies have been limited to ten contacts, and additional contacts are obtained by using parallel and slave connected reed relays.

The principal units of the line identifier are a hundreds scanner 1301, a tens scanner 1302, and a units scanner 1401. These units may be scanners or parallel test and lockout circuits which perform the following functions: (1) a signal at any one of the inputs causes a device corresponding with this input to be set, (2) with one of these devices in set condition signals at other inputs are inhibited from setting their corresponding device, and (3) the device in said position operates a corresponding relay. Many circuits exist which meet these requirements, In one chosen embodiment scanners operated under the control of pulse sources and sequence state circuits in the sequence and supervisory unit 290 have been used. The output devices comprise relay drivers 1331–1340 from hundreds scanner 1301, relay drivers 1341–1350 from tens scanner 1302, and relay drivers 1511–1520 from units scanner 401. A relay driver device, shown symbolically by a triangle with a line across it and an associated make contact, comprises a single transistor amplifier with a winding in its collector circuit and the single contact which is a reed capsule operated by the winding. The relays which are operated under the control of the relay drivers are relays H1–H10 associated with the hundreds scanner 1301, relays T1–T10 associated with the tens scanner 1302, and relays U1–U10 associated with the units scanner 1401. These relays along with the scanners, relay drivers, and circuits immediately associated therewith comprise the line identifier 262 and are normally common to five line groups of 1000 lines each. The connect relays of unit 148 which are individual to one line group of 1000 lines include relays HE, BB, and ten relays HEP1 to HEP0 shown in FIG. 13; and 100 rlays LS11 to LS00 shown in FIG. 14. The principal connect relay of unit 148 is relay LG1 shown in FIG. 14, which is shown as having a slave relay LG1' in FIG. 13.

Referring again to FIGS. 11 and 12, looking at the P leads of the horizontal inputs of a single one of the cards such as card C1, a negative potential applied to the P lead in any one of the line circuits can be detected through the diodes and pull windings of the A and B matrix cards, since the diodes are forward biased. Thus a negative potential applied to the P lead at any line circuit of hundreds group 1 such as to conductor L111P, can be detected at the first horizontal input of card C1, on conductor BC101P. Likewise a call in any of the other hundreds group of the 1000 line group will appear at a corresponding one of the P leads of the horizontal inputs of card C1. These leads are taken through cable P to FIG. 13, and thence through contacts 1 to 10 respectively of relay HE and amplifiers 1311 to 1320 respectively, and make contacts of relay TL to the ten inputs of hundreds scanner 1301. Likewise in each hundreds group the P leads of the horizontal inputs of any one of the cards can detect a potential at any one of the ten lines of the A matrix card connected to that input. Thus in hundreds group 1 a call at any one of the lines L111 to L110 at the inputs of card A11 will appear at the conductor AB111P at the input of card B11. The ten leads AB111P to AB101P from card B11 are taken through cable P to FIG 13, and through respective make contacts of relays HEP1 and relay HE to the ten inputs of the tens scanner 1302. Likewise from each of the other hundreds groups the ten P leads from the horizontal inputs of one of the B cards, namely card B21 of hundreds group 2, card B31 of hundreds group 3 and so on to card B01 of hundreds group 10, are taken in FIG. 13 through contacts of corresponding one of the relays HEP2 (not shown) to HEP0. At the horizontal input terminals of the A cards, all of the 1000 P leads, ten from each card of the 100 A matrix cards, for example leads L111P to L110P of card A11, taken via cable P to FIG. 13, thence to FIG. 14, pass through contacts of a corresponding one of the relays LS11 to LS00, and then common together and are taken through contacts 11–20 of relay LG1 and contacts 1–10 of relay UP to the units scanner 1401. The inputs to each of the scanners are multipled to the other line groups as shown by the multiple symbols which in the case of the hundreds and tens scanner are just to the right of the contacts of relay HE, and in the case of the units scanner just to the right of the contacts of relay LG.

The ten P leads from the horizontal P leads of card C10 namely conductors BC110P to BC010P (FIG. 13) are also taken through another set of ten contacts 11 to 20 of relay HE and amplifiers 1321 to 1330 through make contacts of relay TL to the hundreds scanner 1301. These leads are also from the first B card of each hundreds group but from the second vertical. Thus in case of failure of diodes in the B card this second group of P leads may be switched in. This is provided by taking the outputs of the amplifiers 1311 to 1320 and 1321 to 1330 to a parity check circuit 1303. This circuit is arranged to detect failures and in response thereto to operate the relay TL to open its break contacts and close its make contacts so that the inputs BC1110P to BC010P are switched into the hundreds scanner instead of the inputs from card C1.

OPERATION—LINE IDENTIFICATION FOR AN ORIGINATING CALL

Assume now that the subscriber at station S111 initiates a call. In response to the closing of the subscriber loop, the line relay L of line circuit LC111 operates and closes its contacts. Negative battery potential through the break contacts of relay LR (FIG. 13) is applied over conductor LR1 and resistor 1111 of line circuit LC111 and the contacts of relay L to the pull conductor L111P, thence through diode 1101 and winding 1102 on card A11, diode 1201 and pull winding 1202 on card B11, to conductor BC101P at the input of card C1, thence through cable P to FIG. 13. The potential is also applied through diode 1211 and winding 1212 of card C1 to the P lead of vertical V1, thence by way of conductor OCA1 to an input of the allotter 1552 in FIG. 15. Note that the potential on the pull lead L111P is also applied through another path on P conductors through the A, B and C stages to a vertical P conductor of card C10 and thence by way of conductor OCB1 to another input of the allotter 1552. Also at the horizontal input of card C10, the potential appears on conductor BC110P shown in FIG. 13. This use of alternate signals by way of card C10 provides an extra margin of safety in case of failures of diodes in the switching network.

The signal to the allotter through OR gate 1561 and other circuits not shown operates the relay driver 1571 which at its contacts supplies ground for operating relay AA1. The signal potential of conductor OCA1 and OCB1 through contacts 1 and 2 of relay AA1 and through gate 1553 is supplied to conductor OC, and thence through cable SS to the sequence and supervisory circuit 290 (FIG. 2), which causes the marker to enter an originating call sequence state. At contacts 3 of relay AA1 ground is applied to conductor LG1A to operate the relay LG1, which connects line group 1 to the marker. Contacts 21 of relay LG1 supplies ground potential to operate the slave relay LG1′, which at its contacts 1 operates relay HE. Relay HE at its contacts 1 to 10 connects through the conductors BC101P to BC001P through the amplifiers 1311 and 1320 and the break contacts of relay TL to the hundreds scanner 1301, and also at its contacts 11 to 20 connects through the alternate conductors BC110P to BC010P, and at its contacts 21 to 30 prepares operate circuits for the relay HEP1 to HEP0.

In response to a signal from the sequence and supervisory circuits via cable SS, a 10-step counter in the hundreds scanner 1301 starts and steps until it finds coincidence of its output with a signal at one of the inputs to the scanner, which in this case is step 1, since the call is from hundreds group 1. The relay driver 1331 operates and supplies ground potential to operate the relay H1. Relay H1 through its contacts 2 locks to ground potential at break contacts 1 of relay LKM. Ground potential through contacts 4 of relay H1 completes the operating path for relay HEP1. The conductors AB111P to AB101P from card B11 through cable P are connected through contacts 1 to 10 of relay HEP1 and contacts 31 to 40 of relay HE to the inputs of the tens scanner 1302. A signal at contacts 5 of relay H1 is transmitted by way of conductor HX and cable SS to the sequence and supervisory circuits, which causes the tens scanner to start counting. Since the call is in tens group 1 the tens scanner finds coincidence at step 1 and operates the relay driver 1341, which in turn supplies ground potential to operate the relay T1. Relay T1 through its break contacts 4 locks to ground potential at break contacts 2 of relay LKM.

Negative battery potential is supplied through resistor 1402 and contacts 2 of relay T1 in multiple to the five line groups and through contacts 1 of relay LG1 to ten of the 100 LS relays in line group 1 namely relays LS11, LS21, to LS91, and LS01. Ground potential is supplied through contacts 3 of relay H1 in multiple to the five line groups, and through locking diodes to ten of the 100 LS relays of the line group, namely relays LS11, LS12, to LS19 and LS10. Therefore relay LS11 in line group 1 operates.

The ten leads L111P to L110P from the horizontal inputs of card A11 through cable P are connected through contacts 1 to 10 of relay LS11, contacts 11 to 20 of relay LG1, and contacts 1 to 10 of relay UP to the inputs of units scanner 1401. At contacts 3 of relay T1 a signal is sent by conductor TX and cable SS to the sequence and supervisory circuits to cause the counter in units scanner 1401 to start stepping. The counter finds coincidence at step 1 and operates the relay driver 1511 which in turn operates the relay U1. Relay U1 at its contacts 4 and break contacts 3 of relay LKM locks to ground.

With the relays H1, T1, and U1 operated the line L111 is identified. The identity of the calling line is supplied through cable SR to the send receive circuit 280, from negative battery through resistor 1403 and contacts 1 of relay H1, from negative battery through resistor 1404 and contacts 1 of relay T1, and from negative battery through resistor 1501 and contacts 1 of relay U1. The marker makes a route selection, for example to originating junctors OJ91. Potential is supplied from negative battery through resistor 1502 and other circuits not shown, through contacts 3 of relay U1, contacts 1 of relay LS11 to conductor L111P, through cable P to card A11 thence through diode 1101, winding 1102, to card B11, thence through diode 1201 and winding 1202 to card C1, thence through diode 1221 and winding 1222, through pull control circuits not shown to ground at conductor 1229. After the hold path is established the marker releases. The release process includes supplying a signal from sequence and supervisory circuits to operate relay driver 1503, which at its contacts supplies an operating path for relay LKM which opens its break contacts 1, 2 and 3 and thereby releases the hundreds, tens and units relays, which in this case are H1, T1 and U.

TERMINATING CALL

On a terminating call, at the input of the allotter 1552, one of the signals TC1, TC3, TC5, TC7, or TC9 through the corresponding one of the OR gates 1561 to 1565 causes selection of a line group. For example a signal on lead TC1 through gate 1561 operates relay driver 1571, which in turn operates relay AA1, which operates relay LG1. The send-receive circuit 280 receives the line identity from one of the senders 671–680. This identity is supplied via cable SR to one of the conductors HT1 to HT0, to operate the corresponding one of relays H1 to H10; to one of the conductors TT1 to TT0 to operate the corresponding one of relays T1 to T10; and to one of the conductors UT1 to UT0 to operate the corresponding one of relays U1 to U10. This causes a path to be established from negative potential through resistor 1502 and the various relay contacts to the pull conductor of the selected line circuit, when the pull command is received from the sequence and supervisory circuit.

ADVANTAGES

With the line identification arrangement as described herein, only one contact per line relay is required, which means a saving in cost and increased reliability.

With the marker controlled crosspoint switching network used in this system, it is necessary to take the 1000 conductors from the inputs of the A cards through a relay tree into the marker for pulling the crosspoint relays. The further use of these pull conductors in the marker for units identification represents a doubling up of functions on this apparatus and an equipment saving.

Grouping from the 1000 lines into groups with the same hundreds, tens or unit identity through the use of separate special decoupling diodes and multiples at the A cards is avoided.

The use of the inputs of an alternate one of the C matrix cards is easily provided. This redundancy feature requies only ten additional make contacts for connection to the hundreds scanner.

The system is self checking with respect to the diodes of the switching network used in the identification:

(a) Shorted diodes in card C1 can cause the appearance of a negative potential at each of the leads BC101P to BC001P when there is only one line in only one hundreds group which has its relay L operated. The hundreds scanner will only select one of these ten marked leads and operate the corresponding one of the relays H1 to H10. If the selected hundreds group is the wrong one, no tens identity will be found because for this group no one of the leads AB111P to AB101P at card B11 is marked. If one of these leads is marked it means that also in this hundreds group there is a relay L operated. In the first case the error will be detected by the parity check circuit 1303 and operate relay TL to switch over to the leads from card C10.

(b) Open diodes in card B1, when detected, can be avoided by switching over to the inputs to the hundreds scanner from card C10.

(c) Shorted diodes in a B card will result in more than one tens group being marked, but only one will be selected by the tens scanner. If the wrong tens group is selected no units identity will be found, which indicates a shorted diode in the B card.

(d) A shorted diode in an A card will cause the selection of a wrong unit identity.

In this way there will never be two lines connected in parallel. Only when a diode is shorted in an A card can a wrong but idle line be pulled. This wrong connection releases as soon as the line is connected at the originating junctor.

Patent No. 3,170,041 by K. K. Spellnes, for Communication Switching System, issued February 16, 1965, covers features of the switching system described herein, and in columns 33–35 thereof lists other related patent applications, some of which cover features disclosed herein. Note particularly the discussion of application S.N. 240,497 in column 34, lines 54–64.

While I have described above the principle of my invention in connection with specific apparatus, it is to be clearly understood that this description is made only by way of example and not as a limitation to the scope of my invention.

What is claimed is:

1. In a communication switching system, a plurality of subscriber lines having line circuits individual thereto, a switching network for selectively providing communication paths from said lines, said network comprising a plurality of stages, each stage having a plurality of switching devices for selectively connecting input terminals to output terminals, the line circuits being individually connected to the input terminals of the first stage, each stage other than the first having its input terminals connected by interstage links to the output terminals of the preceding stage, each switching stage having a diode associated with each switching device and connected in one given conductor with its poles connected for forward conduction responsive to a first plurality at the input terminal with respect to the output terminal, a line identifier arrangement with connections to said given conductor of certain ones of said switching stage terminals, means responsive to a service request signal at at least one calling one of said lines for applying a first-polarity potential at the associated first stage input terminal to said given conductor, means including said line identifier arrangement operated in response to said potential to record the identity of the line requesting service.

2. In a communication switching system, the combination as claimed in claim 1, wherein said plurality of lines is divided into line groups, with each line group divided into groups, and each group further divided into sub groups, wherein each of the stages of said switching network is divided into a plurality of matrix units, with each first-stage matrix unit having only line circuits of one sub group connected thereto, with a plurality of second-stage matrix units having links connected to the input terminals only from the output terminals of first-stage matrix units of a group, and with a plurality of third-stage matrix units connected with links to their input terminals only from second-stage matrix units of a line group, means responsive to said service request signal for connecting at least one second-third stage link from each group to the line identifier arrangement, means in the line identifier arrangement for recording the tials to the given conductor at the first stage input terminal of the identified line and at another given point of the selected path to cause current flow of a value greater than said certain value through the windings of the switching devices in the selective path between these points to thereby actuate the switching devices and establish the communication path and the output terminal.

9. In a communication switching system, the combination as claimed in claim 8, wherein there may be service requests from a plurality of said lines simultaneously, and wherein each of said recording means in the line identifier arrangement is arranged to record the identity of only one group in which there is a calling line requesting service, whereby only one calling line is identified at a time.

10. In a communication switching system, the combination as claimed in claim 9, wherein in response to said service request signal there is provided means to connect the given conductors of the input terminals of two of said third-stage matrix units to test equipment, means controlled by said test equipment for selecting the conductors from only one of said third-stage units to said line identifier arrangement.

References Cited by the Examiner

UNITED STATES PATENTS

| | | | |
|---|---|---|---|
| 2,739,187 | 5/56 | Holden | 179—18 |
| 2,879,338 | 3/59 | Joel | 179—18 |
| 2,928,904 | 3/60 | Morris | 179—18 |

ROBERT H. ROSE, *Primary Examiner.*

WILLIAM C. COOPER, *Examiner.*